United States Patent
McGinley et al.

[15] 3,693,452
[45] Sept. 26, 1972

[54] BROILER AND GRILL

[72] Inventors: William L. McGinley, 6142 Averill Way, Dallas, Tex. 75226; Johnnie Prine Pearson, Route 2, Box 147A, Terrill, Tex. 75160

[22] Filed: June 3, 1971

[21] Appl. No.: 149,644

[52] U.S. Cl. ...................99/386, 99/391, 99/401, 99/443 C, 219/388, 219/405, 219/530
[51] Int. Cl. .................................................A47j 37/00
[58] Field of Search......219/388, 405, 411, 413, 462, 219/530, 464, 540; 99/346, 349, 386, 389, 391, 401, 427, 443 C, 443 R

[56] References Cited

UNITED STATES PATENTS

| | | | |
|---|---|---|---|
| 3,611,913 | 10/1971 | McGinley | 99/349 |
| 3,589,274 | 6/1971 | Murray | 99/349 |
| 3,520,249 | 7/1970 | Miller, Jr. | 99/443 C X |
| 3,515,854 | 6/1970 | Williams | 219/388 |
| 3,098,921 | 7/1963 | Jepson | 219/540 X |
| 3,272,154 | 9/1966 | Kranz | 219/388 X |
| 3,391,633 | 7/1968 | Boosalis | 99/443 R |
| 3,425,341 | 2/1969 | McGinley | 99/423 |
| 3,435,188 | 3/1969 | Colard | 219/530 X |
| 3,517,605 | 6/1970 | Hursch et al. | 943 C X/ |
| 3,569,672 | 3/1971 | Hurko | 219/464 |

*Primary Examiner*—Volodymyr Y. Mayewsky
*Attorney*—Robert D. Teichert and Donald J. Koprowski

[57] ABSTRACT

An automatic broiler and grill has heat generating means for cooking and heating food products and heat exchanging means located to ensure uniform heating of the product, and to prevent overheating of the grill plate as food products are conveyed along the grill plate. A thermostatically controlled auxiliary heater is disposed beneath the grill plate to ensure thorough cooking of the food products. A sheet of non-sticking substance may be loosely hung on the grill plate to prevent the food products from sticking to the grill plate. A conveyor assembly is arranged to provide for the loading of a plurality of food products at one time as well as to convey the food products past and in contact with the grill plate. Heat reflecting means are provided to prevent heat loss upwardly and outwardly of the heat generating means.

9 Claims, 8 Drawing Figures

PATENTED SEP 26 1972 3,693,452

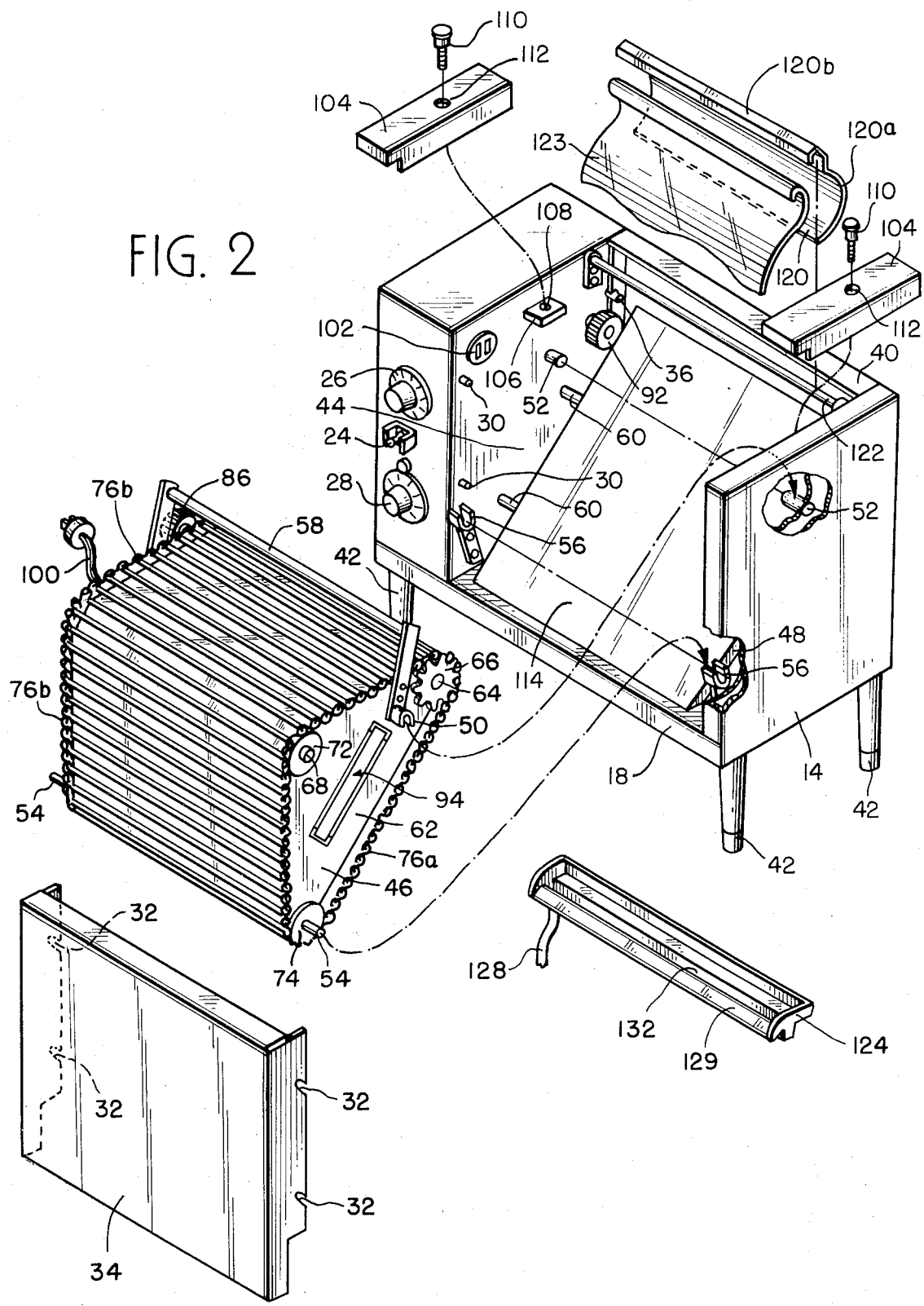

BROILER AND GRILL

BACKGROUND OF THE INVENTION

In the automatic cooking and heating of food products on a broiler and grill having heat generating means and a conveyor for conveying the products past and in contact with a grill plate, it is desirable to provide an apparatus which will cook the products uniformly in spite of varied load conditions. At the same time, it is desirable to provide broiling and grilling means in such a manner that food particles will not stick to the grilling surface which may result not only in rendering the product unfit for serving, but also may prevent the movement of that product along the grill plate thereby jamming the conveyor.

Normally there is a wide fluctuation in the demand placed on an apparatus of this type. For example, during busy periods the grill plate might be kept completely covered with products for a considerable amount of time. During slack periods, on the other hand, there may be only a few products conveyed on the grill plate at one time, or there may be times when none at all are on the grill plate. Because the speed of the conveyor remains constant while the amount of heat absorbed by the product varies, a problem is encountered in supplying enough heat to cook the products uniformly and thoroughly while at the same time preventing overheating of the grill plate. For example, because the cooking of the product is accomplished in a relatively short period of time, a matter of a minute or minutes, a relatively great amount of heat must be supplied to the product, especially if a large number of products are conveyed on the grill plate at one time. This may be accomplished by providing a heating means disposed above the grill plate to simultaneously heat the grill plate and broil the product. If an idle period is suddenly encountered, however, very little or no heat is required to cook the product and the majority or all of the heat supplied from above will be absorbed by the grill plate. This leads to several undesirable results. First, any grease or particles that may be on the grill plate will be carbonized because of the excess heat, or may even catch fire, thereby deteriorating the cooking surface and resulting in impairment of flavor of products subsequently cooked. Secondly, if any non-stick substance, such as teflon (polytetrafluoroethylene) is used as a surface on which to convey the product, such substance may be deteriorated by the excess heat. Third, the few products being conveyed along the grill plate may be overcooked.

It is necessary even during such slack or idle periods to maintain a high level of heat in the cooking area so that there would be sufficient heat to thoroughly cook the product should demand for a large number thereof suddenly occur. Thus, it is necessary to keep the heating means at a temperature sufficient to cook the products to a desired degree.

In addition, if the grill plate is too hot when the raw product first contacts same, the product will sear and stick thereto with the same results from sticking described above. Accordingly, it is desired to maintain the grill plate at a lower temperature at the inlet end thereof and provide a gradual increase in temperature as the product progresses along the plate. In this manner the natural juices from the product begin to gradually seep out onto the grill plate and provide a self-lubricating effect and the resultant prevention of sticking of the product.

It is also desirable in the use of a grill of this type to be able to load as many hamburgers or other products directly onto the conveyor at one time while keeping the unit as compact as possible. Heretofore the hamburgers would be loaded at one end of the grill plate and thus only one row could be loaded at one time. The operator of the apparatus would then have to wait until that row of hamburgers was conveyed along the grill plate a sufficient amount to enable the next row of products to be loaded.

SUMMARY OF THE INVENTION

The above problems are overcome and other advantages introduced by the provision of a broiler and grill having a main heat generating means disposed above the grill plate which can provide sufficient heat to thoroughly cook a large number of food products at one time as they are conveyed along the grill plate. Heat reflecting means are provided to prevent heat loss upwardly and outwardly of the heat generating means. A heat exchanging means below the grill plate and in direct contact therewith rapidly dissipates excess heat when there are few or no products on the grill plate. A thermostatically controlled auxiliary heater in contact with the heat exchanging means beneath the grill plate can rapidly supply additional heat should a great number of products again be placed in the grill plate to ensure thorough cooking thereof.

A sheet of disposable material may be hung over the grill plate to prevent food products from directly contacting the plate.

The conveyor assembly is arranged to provide for the loading of a great number of food products at one time.

DESCRIPTION OF THE DRAWINGS

FIG. 2 is an exploded front perspective view of the invention taken from the right side thereof.

DETAILED DESCRIPTION OF THE INVENTION

Figure 1:
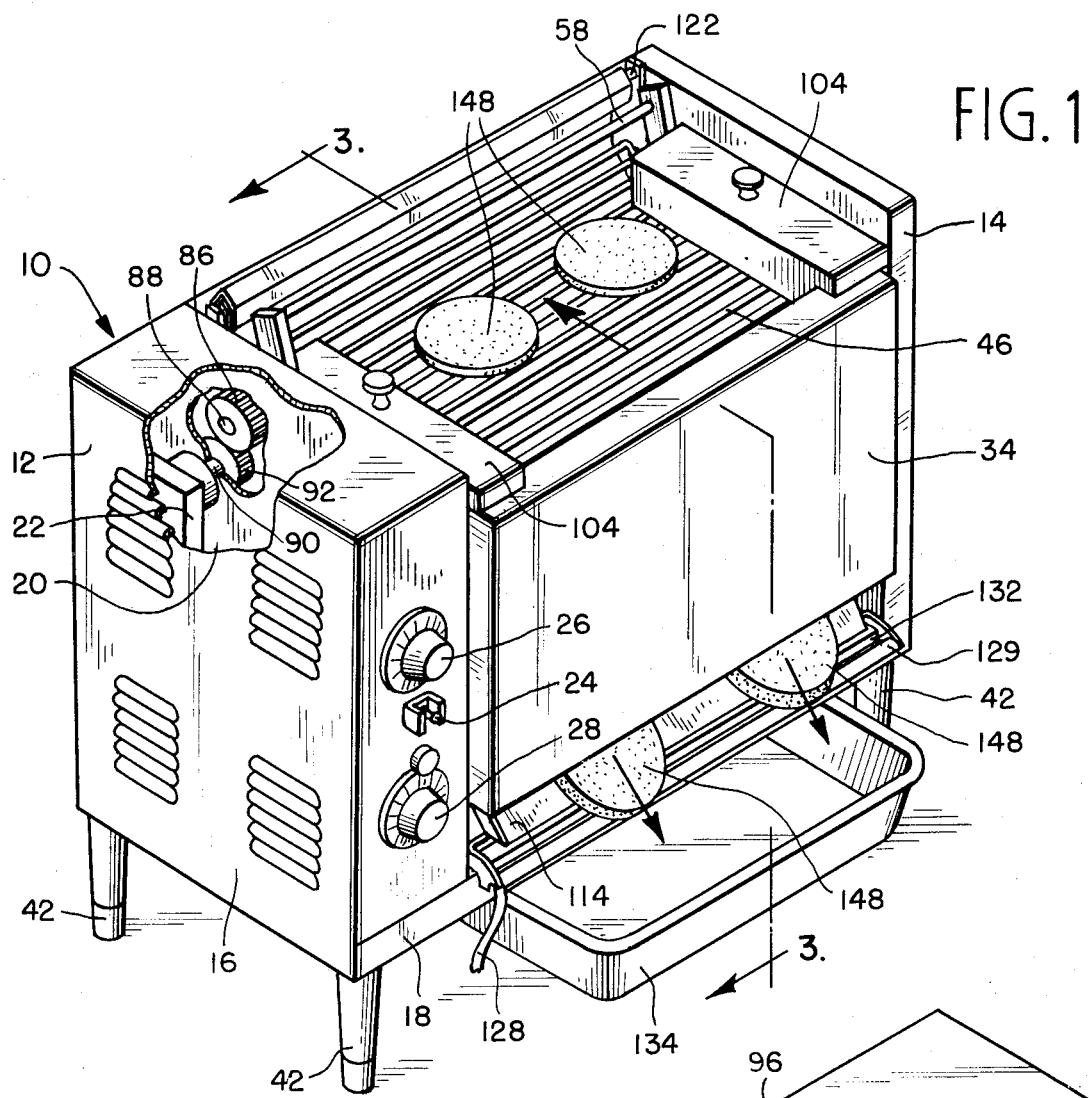
FIG. 1 is a front perspective view of the broiler and grill of my invention taken from the left front side thereof.

The automatic broiler and grill 10 has a housing 12 that comprises several panels held together by welding or screws. Right and left panels 14 and 16 form the side walls of housing 12. A bottom panel 18 extends between the side panels 14 and 16. Left panel 16 also forms the left side wall of compartment 20 which houses an electric drive motor 22 and which has mounted thereon a switch 24 which actuates the electric motor, and control knobs 26 and 28 for thermostats which regulate heating elements hereinafter described.

Pairs of pins 30 are mounted on the inside of right panel 14 and compartment 20 to engage slots 32 in removable front panel 34 when the panel is in place on the unit. Like pins 36 engage slots 38 to hold the removable rear panel 40 in place. The housing 12 is mounted on legs 42 which are fastened thereto by conventional connections.

Right panel 14, compartment 20, and front, back and bottom panels 34, 40 and 18 respectively surround a broiling and grilling area designated generally by the numeral 44 within which are located a removable conveyor assembly 46 and a fixed platen assembly 48. Conveyor assembly 46 has on either side thereof an inverted-U-shaped channel 50 secured to its upper end which nests over a corresponding pin 52 on either side of the broiling and grilling area 44. Pins 54 on either side of conveyor assembly 46 at its lower front end nest in corresponding U-shaped channels 56. The pins 54 may be extensions of a shaft hereinafter described. The entire assembly 46 can thus be readily removed from the unit by grasping the handle 58 and lifting the assembly upwardly and outwardly therefrom.

An inclined platen assembly 48 extends between right panel 14 and compartment 20 and is secured to each of these members in a conventional manner such as a connection of pins 60 combined with nuts and bolts or welds. A slight space may separate the platen assembly 48 from the compartment 20 and right panel 14 to allow for easy cleaning thereof.

Figure 3:
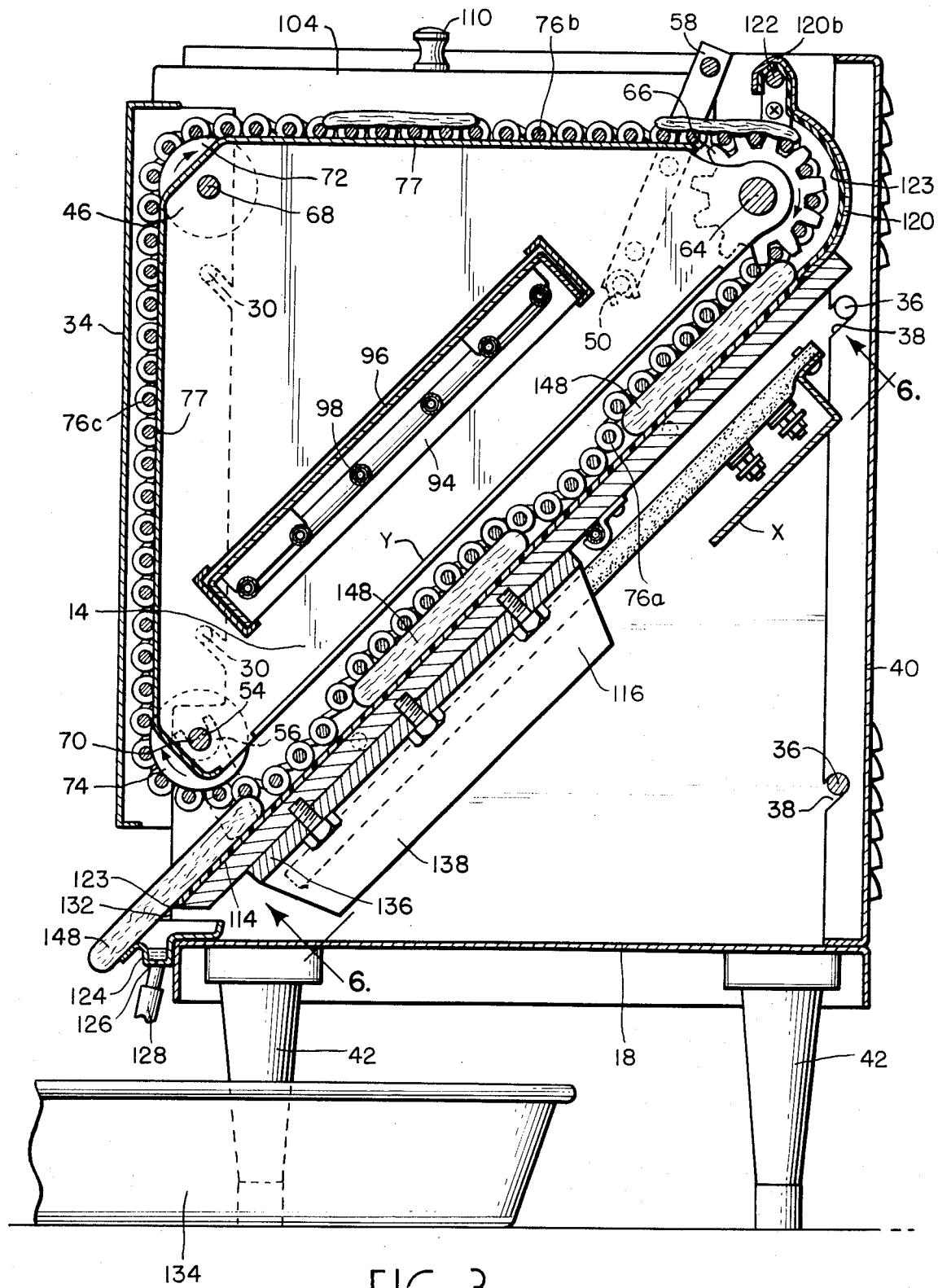
FIG. 3 is a vertical cross-sectional view taken along line 3—3 of FIG. 1.
Figure 6:
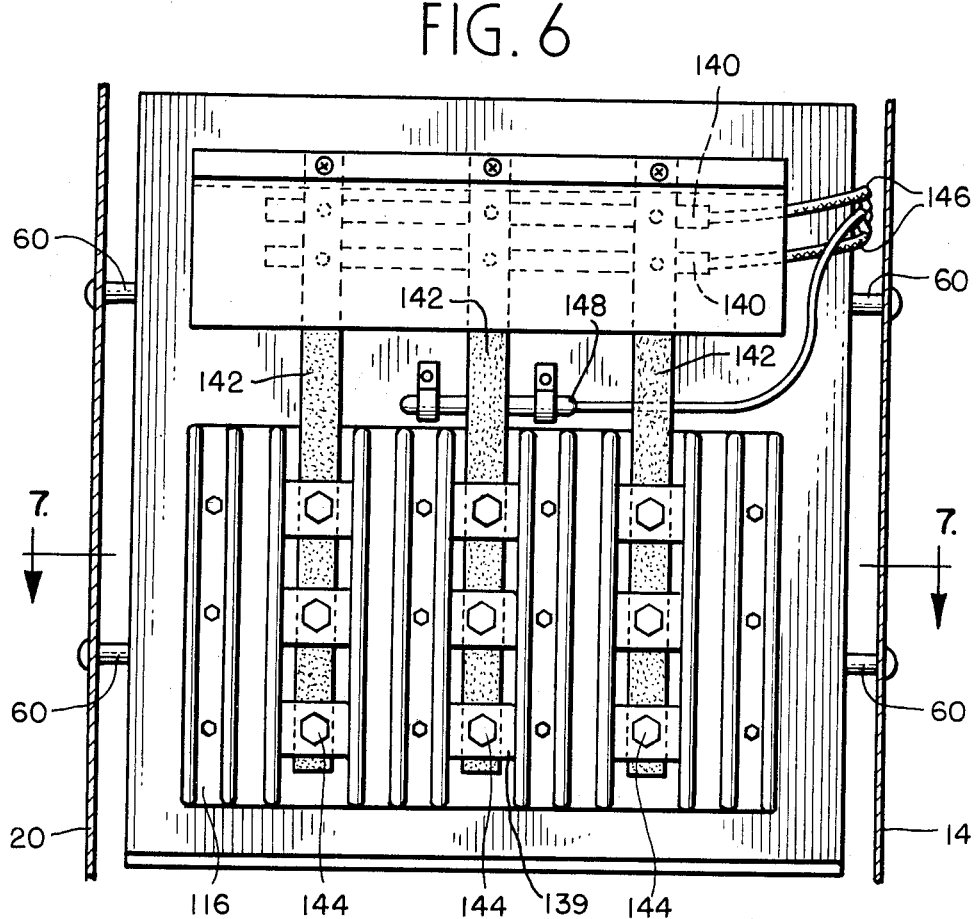
FIG. 6 is a bottom view of the broiler and grill showing the heat exchanging means and auxiliary heating means taken along line 6—6 of FIG. 3.
Figure 7:
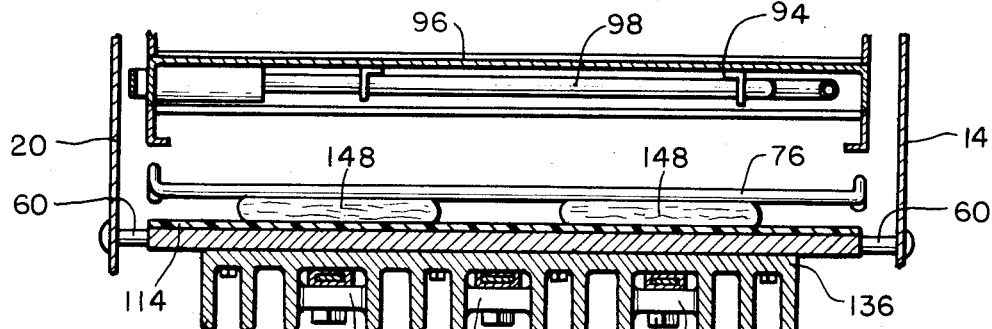
FIG. 7 is a cross-sectional view taken along line 7—7 of FIG. 6.

As best shown in FIGS. 2 and 3, the conveyor assembly 46 has a generally triangular outline when viewed from the side. A suitable frame on which to mount the various parts of the assembly 46 may comprise a pair of rigid side plates 62 and conventional cross bracing therebetween. At the intersection of each pair of legs in the triangular outline of the conveyor assembly 46 a rotatable shaft is mounted. Drive shaft 64 is located at the upper, rearward end of the assembly and has fixedly secured thereto a pair of drive sprockets 66. The upper and lower forward shafts 68 and 70 each has mounted thereon a pair of idler sprockets 72 and 74. A conveyor chain 76 passes around pairs of sprockets 66, 72 and 74 so that one leg 76a of chain 76 extends slightly above and parallel to inclined platen assembly 48. Legs 76b and 76c of chain 76 are preferably substantially horizontal and vertical so that the three legs 76a, 76b and 76c form a right triangle with legs 76a as the hypotenuse. A metal reflective shield 77 of approximately the same width as the conveyor chain 76 extends just beneath conveyor chain 76 just inside the top leg 76b and front leg 76c thereof.

Figure 8:
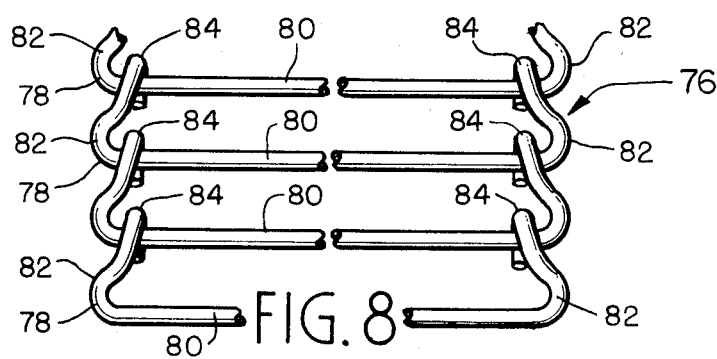
FIG. 8 is an enlarged fragmented view of a portion of the conveyor chain.

The chain assembly 76 comprises a plurality of elongated chain elements 78 as best shown in FIG. 8. Each chain element 78 has a rod 80, each end of which is formed with an upward bend 82 leading to a hook portion 84 that extends around the next rod 80 adjacent the hook portion 84 of that next rod. The result is a continuous conveyor chain 76 mounted with the rods 80 meshed with the teeth of sprockets 66, 72 and 74. The conveyor chain is somewhat slack for a purpose to be described, as best shown in FIG. 3.

Drive gear 86 is fixedly mounted on the extension 88 of drive shaft 64. Shaft 90 on drive motor 22 has mounted thereon a suitable gear 92 to mesh with drive gear 86 and thereby drive same when the motor 22 is actuated with the end result that the conveyor chain 76 is driven in a generally clockwise direction when viewed in FIG. 3.

Figure 4:
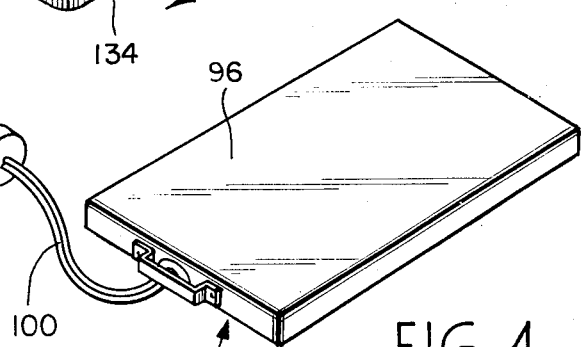
FIG. 4 is a perspective view of the heat generating means.
Figure 5:
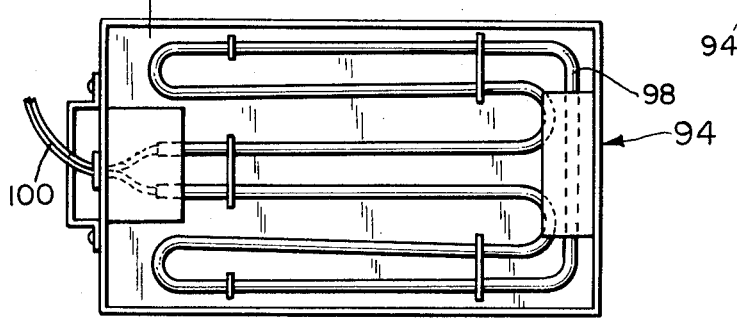
FIG. 5 is a bottom view of the heat generating means.

A removable heater assembly or heat generating means 94 as shown removed from its normal position within conveyor assembly 46 in FIGS. 4 and 5 comprises a stainless steel housing 96 and heating element 98 such as a calrod to which current is supplied by means of cord 100. To enable the assembly 94 to be easily removed from within the housing 12, the inside wall of compartment 20 is provided with a suitable electrical socket 102. The heater assembly 94 is mounted within the conveyor assembly 46 in a plane substantially parallel to that of the inclined platen assembly 48. Its leading edge is located at a point somewhat downstream from the upper edge of the grill plate so that the upper portion of the grill plate will not be exposed directly to radiating heat from the heat generating means 94.

A pair of guides 104 are removably mounted on brackets 106 which extend inwardly from compartment 20 and right panel 14 and each of which is provided with a threaded bore 108. A threaded bolt 110 is inserted through an aperture 112 in each of the guides 104 and mated with a corresponding bore 108 to secure the guide to the bracket 106. In its secured position the bottom of each guide should be as close as possible to leg 76b of chain 76 without interfering with the travel thereof. While the above bolt and bracket method is herein described, any other suitable means for securing the guides may be employed.

Platen assembly 48 comprises a grill plate 114 which has a heat exchanging means 116 and an auxiliary heater 118 securely affixed therebeneath. A removable inlet guide 120 at the upper end of the grill plate 114 has a lower curved portion 120a which merges at its upper end with a hooked portion 120b. The guide 120 is hung in position on transverse rod 122 so that the lower edge of curved portion 120a rests on the grill plate 114 near the top thereof. A sheet 123 of disposable material may be hung over the guide 120 by trapping the upper end of sheet 123 between the hooked portion 120b of guide 120 and rod 122. Such material may be plain metal foil, metal foil coated with a non-stick substance such as teflon, or it may be comprised of a non-stick substance alone.

Just beneath the lower end of the grill plate 114 there is suitably secured a grease-catching trough 124 which extends for a width at least equaling that of the width of the grill plate 114. The trough 124 is inclined slightly to allow grease collected therein to flow into a drain hole 126 in one end thereof and through tube 128 into a suitable receptacle (not shown).

The outermost edge portion 130 of trough 124 is an extension of the plane of the grill plate 114 so as to cooperate therewith to form an outlet chute 132. Once a produce has left the outlet chute 132 it may be removed manually or caught in a suitable receptacle such as pan 134.

The heat exchanging means 116 is comprised of a base plate 136 which is fastened into direct contact with the underside of grill plate 114 and a plurality of raised longitudinal fins 138 formed integrally therewith. A series of lateral bars 139 having threaded bores therein are spaced apart from the base plate 136 and form bridges between several of adjacent fins. The heat exchanging means 116 extends in a longitudinal direction only along the lower portion of the grill plate 48 for reasons hereinafter described. The heat exchanger is preferably an aluminum casting though other materials having good heat conductivity may be used.

The auxiliary heater 118 comprises a pair of bus bars 140 which cross and contact a plurality of heating elements 142 which are inserted into the space between the base plate 136 and the lateral bars 139 of heat exchanging means 116. A plurality of set screws 144 clamp the heating elements 142 firmly against the base plate 136 of heat exchanger 116. Current is supplied to the heater 118 by means of wires 146.

A temperature sensing means 148 is clamped against the bottom of the grill plate 114 which cooperates with the thermostat for auxiliary heater 118 to provide temperature control on the grill plate.

OPERATION

The broiler and grill are operated merely by flicking switch 24 to the "on" position. This energizes the motor to operate to drive gear 92 and through gear 86 and drive sprockets 66 produce a clockwise rotation of the conveyor chain 76 as viewed in FIG. 3. At the same time, the electrical circuits by which control knobs 26 and 28 regulate the temperature of the heat generating means 94 and auxiliary heater 118 are activated. The control knob 26 for the upper heat generating means is set at a constant temperature sufficient to provide enough heat to cook the product as desired.

Hamburgers 148 or other products are introduced into the broiler and grill by placing them on the top leg 76b of the conveyor chain 76 which is exposed at the top of the housing 12. Because a relatively large expanse of conveyor is exposed a correspondingly large amount of hamburgers can be loaded at one time. Guides 104 on either side of the loading area prevent particles of product from falling off the side of the conveyor and also prevent the product from becoming hung-up or damaged by the drive sprockets 66.

When the hamburgers reach the rear of the loading area they are guided around onto the grill plate 114 by the curved portion 120a of inlet guide 120. As shown in FIG. 3, the conveyor chain 76 is somewhat slack to allow its weight to press the hamburgers firmly against the grill plate 114 while they are being cooked by heat from heat generating means 94. Heat shield 77 directs the heat toward the grill plate and thereby prevents heat loss upwardly and outwardly of the cooking area 44. At the same time, the horizontal portion of shield 77 prevents particles of product from falling down onto the heat element 96. As the meat cooks it will give off a certain amount of grease and juice which runs down the inclined cooking surface and into the grease catching trough 124 and out through drain hole 126 and tube 128 into a suitable receptacle. The hamburgers themselves proceed on down the grill plate 114 into the outlet chute 132 where they may be removed manually or allowed to fall into the collecting pan 134 or other receptacle.

As above mentioned, in prior broilers and grills, as long as the hamburgers are loaded at a fairly constant rate, a given setting on control knob 26 for the heat generating means 94 will provide a proper amount of heat to produce uniformly cooked products. However, if the conditions vary as described above in the Background of the Invention, the problems described therein would be encountered. In accordance with the invention, however, the heat exchanging means 138 dissipates heat when the grill plate becomes too hot and thereby overcomes the problems of overheating therein described. More particularly, when the heat generating means is set at a level of temperature to provide enough heat to cook a heavy load of products and then a slack period suddenly occurs, the heat exchanging means 116 serves to draw excess heat away from the grill plate 114, thereby preventing overheating thereof. If another heavy load of products should then suddenly be loaded onto the conveyor, and the temperature on the grill plate 114 should fall below a predetermined level, the thermostatic control of the auxiliary heater 118 causes that heater to supply additional heat to bring the temperature on the grill plate 114 up to the desired level. When auxiliary heater 118 is on, the heat exchanging means serves to facilitate the supply of heat from the heater 118 to the grill plate 114. Thus, while the product is being conveyed across the grill plate 114 in a constant, relatively short period of time, the heat exchanger 116 provides both a quick means for withdrawal of heat when there is an excess supply thereof and serves as a conduit to supply heat to the grill plate 114 from the auxiliary heater 118 when there is an inadequate supply thereof.

As explained above, it is important that the leading edge of heater assembly 94 is located at a point somewhat downstream from the upper edge of the grill plate 114 so that the upper portion of the grill plate 114 will not be exposed directly to the radiating heat from the heat generating means 94. Locating the heater in this manner provides for a gradually increasing temperature gradient in the direction of travel of the product along the grill plate and prevents sticking of the product to the cooking surface when it first comes in contact therewith. It is desirable to maintain a temperature not greater than approximately 310° F at the upper end of the grill plate and approximately 350° F to 360° F in the cooking area directly beneath the heating means 94. It is also important that the heat exchanging means 116 not extend all the way to the top of the grill plate 114. While the longitudinal placement of heating means 94 and heat exchanger 116 may vary, preferably neither device should extend along approximately the upper one-quarter of the length of the grill plate for best results.

It is thought that the invention and many of its attendant advantages will be understood from the foregoing description and it will be apparent that various changes may be made in the form, construction and arrangement of the parts without departing from the spirit and scope of the invention or sacrificing all of its material advantages, the form hereinbefore described being merely a preferred embodiment thereof.

We claim:

1. A broiler and grill for cooking and heating food products comprising a housing, a grill plate supported within said housing, electric means for generating cooking heat disposed above said grill plate, at least one heat reflective shield supported above said heat generating means to direct said cooking heat onto said grill plate, heat exchanging means disposed below said grill plate to dissipate said heat and thereby prevent over-heating of said grill plate, and an electric auxiliary heater disposed beneath said grill plate, said heater being thermostatically controlled to ensure the provision of a sufficient amount of cooking heat to thoroughly cook said food products.

2. The broiler and grill of claim 1 wherein said heat exchanging means is an aluminum casting.

3. The broiler and grill of claim 1 wherein said grill plate and said conveyor assembly are supported in inclined planes and said conveyor assembly is somewhat slack to press food products against said grill plate.

4. The broiler and grill of claim 1 wherein said grill plate is coated with a non-sticking substance.

5. The broiler and grill plate of claim 1 including a sheet of disposable substance loosely disposed over said grill plate between said grill plate and said heat generating means.

6. The broiler and grill of claim 5 wherein said disposable substance is polytetrafluoroethylene.

7. The broiler and grill of claim 5 wherein said disposable substance is metal foil.

8. A broiler and grill for cooking and heating food products comprising a housing open at the top end thereof, a grill plate supported within said housing, electric means for generating cooking heat disposed above the grill plate, said grill plate being supported in an inclined plane, a conveyor assembly having a first portion thereof inclined in a plane substantially parallel to said grill plate for conveying food products along said grill plate, a second portion thereof located at the top open end of said housing and in a substantially horizontal plane from the upper end of said inclined first portion of said conveyor assembly and a third portion thereof extending between said first and second portions in a substantially vertical plane at the front of said housing, a heat reflective shield disposed in planes substantially parallel to said second and third portions of said conveyor assembly between said second and third portions and said heat generating means to prevent loss of said cooking heat upwardly and outwardly of said heat generating means and to prevent particles of said food product from dropping onto said heat generating means.

9. A broiler and grill for cooking and heating food products comprising a housing open at the top end thereof, a grill plate supported within said housing, electric means for generating cooking heat disposed above the grill plate, said grill plate being supported in an inclined plane, a conveyor assembly having a first portion thereof inclined in a plane substantially parallel to said grill plate for conveying food products along said grill plate, a second portion thereof located at the top open end of said housing and in a substantially horizontal plane from the upper end of said inclined first portion of said conveyor assembly and a third portion thereof extending between said first and second portions in a substantially vertical plane at the front of said housing, a heat reflective shield disposed in planes substantially parallel to said second and third portions of said conveyor assembly between said second and third portions and said heat generating means to prevent loss of said cooking heat upwardly and outwardly of said heat generating means and to prevent particles of said food product from dropping onto said heat generating means, means disposed below said grill plate to dissipate said heat and thereby prevent overheating of said grill plate, and an electric auxiliary heater disposed beneath said grill plate, said heater being thermostatically controlled to ensure the provision of a sufficient amount of cooking heat to thoroughly cook said food products.

* * * * *

UNITED STATES PATENT OFFICE
CERTIFICATE OF CORRECTION

Patent No. 3,693,452     Dated September 26, 1972

Inventor(s) William L. McGinley and Johnnie Prine Pearson

It is certified that error appears in the above-identified patent and that said Letters Patent are hereby corrected as shown below:

--Assignee: American Home Products Corporation
            New York, N. Y. --

Signed and sealed this 13th day of March 1973.

(SEAL)
Attest:

EDWARD M. FLETCHER, JR.                ROBERT GOTTSCHALK
Attesting Officer                      Commissioner of Patents